United States Patent
Miyauchi

(10) Patent No.: US 10,846,863 B2
(45) Date of Patent: Nov. 24, 2020

(54) PIXEL BINARIZATION APPARATUS, METHOD, AND STORAGE MEDIUM

(71) Applicant: CANON KABUSHIKI KAISHA, Tokyo (JP)

(72) Inventor: Takashi Miyauchi, Inagi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 108 days.

(21) Appl. No.: 15/978,673

(22) Filed: May 14, 2018

(65) Prior Publication Data

US 2018/0336685 A1 Nov. 22, 2018

(30) Foreign Application Priority Data

May 22, 2017 (JP) ................. 2017-101042

(51) Int. Cl.
| | | |
|---|---|---|
| G06K 9/38 | (2006.01) | |
| G06K 9/40 | (2006.01) | |
| G06T 5/00 | (2006.01) | |
| G06T 5/50 | (2006.01) | |
| G06T 7/136 | (2017.01) | |
| G06T 7/174 | (2017.01) | |
| G06T 7/194 | (2017.01) | |

(52) U.S. Cl.
CPC ............. *G06T 7/136* (2017.01); *G06K 9/38* (2013.01); *G06K 9/40* (2013.01); *G06T 7/174* (2017.01); *G06T 7/194* (2017.01); *G06K 2209/01* (2013.01); *G06T 5/002* (2013.01); *G06T 5/006* (2013.01); *G06T 5/50* (2013.01)

(58) Field of Classification Search
CPC ........ G06K 2209/01; G06K 9/38; G06K 9/40; G06T 5/002; G06T 5/006; G06T 5/50; G06T 7/136; G06T 7/194; G06T 7/174; G06T 7/11
See application file for complete search history.

(56) References Cited

U.S. PATENT DOCUMENTS

| | | | | |
|---|---|---|---|---|
| 6,282,326 B1 * | 8/2001 | Lee | ................. | H04N 1/4097 |
| | | | | 382/275 |
| 6,317,223 B1 * | 11/2001 | Rudak | ................. | H04N 1/4097 |
| | | | | 358/463 |

(Continued)

FOREIGN PATENT DOCUMENTS

| | | |
|---|---|---|
| EP | 2495949 A1 | 9/2012 |
| JP | 2016-224914 A | 12/2016 |
| JP | 2017-22620 A | 1/2017 |

OTHER PUBLICATIONS

Leptonica; "Grayscale mapping and binarization;" https://web.archive.org/web/20170509180810/http://www.leptonica.com/binarization.html; May 9, 2017; pp. 1-5.

(Continued)

*Primary Examiner* — Kenny A Cese
(74) *Attorney, Agent, or Firm* — Canon U.S.A., Inc. IP Division

(57) ABSTRACT

There is provided an image processing apparatus in which a part used in predetermined processing is specified with use of a relatively small binarization threshold, from parts that have been converted into black pixels through binarization processing using a relatively large binarization threshold.

6 Claims, 9 Drawing Sheets

(56) References Cited

U.S. PATENT DOCUMENTS

2008/0025556 A1* 1/2008 Visan ............... G06K 9/38
382/100
2012/0237121 A1* 9/2012 Kuboyama ........ H04N 1/40012
382/163

OTHER PUBLICATIONS

Research Gate; "Is there any technique to isolate certain regions of the gray level image based on their intensity;" https://www.researchgate.net/post/is_there_any_technique_to_isolate_certain_regions_of_the_gray_level_image_based_on_their_intensity; Jan. 10, 2014; pp. 1-4.

Puneet, Naresh Kumar Garg; "Binarization Techniques used for Grey Scale Images;" International Journal of Computer Applications (0975-8887), vol. 71—No. 1, pp. 8-11.

* cited by examiner

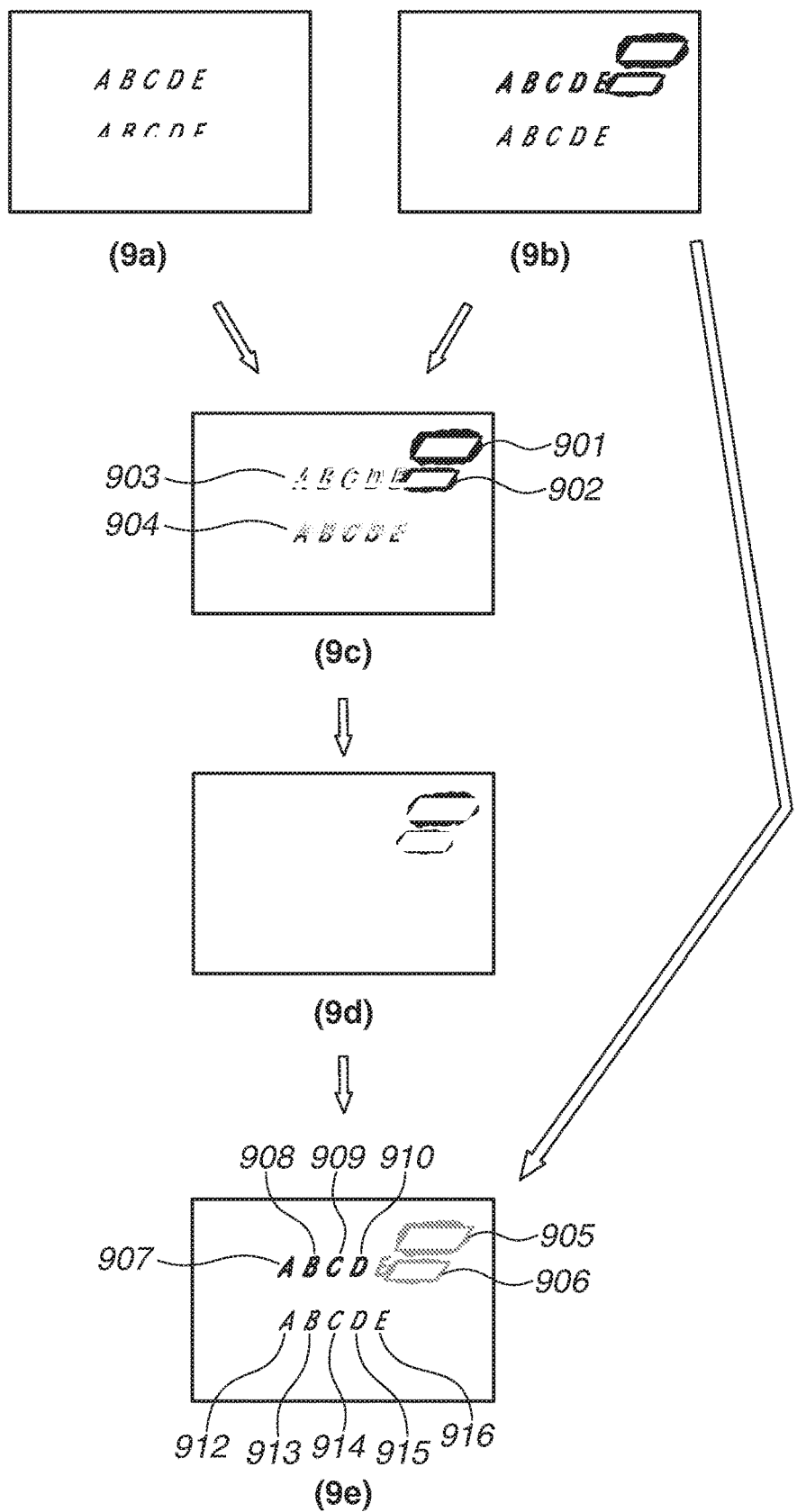

PIXEL BINARIZATION APPARATUS, METHOD, AND STORAGE MEDIUM

BACKGROUND OF THE INVENTION

Field of the Invention

The present invention relates to an image processing apparatus, an image processing method, and a program.

Description of the Related Art

In an existing technology, a pixel darker than a threshold in an input image is converted into a black pixel through binarization processing, and predetermined processing for a character is performed while a group of the black pixels is regarded as a character. To handle, as a character, a part where a character is blurred in the image, it is desirable to use a binarization threshold to cause the blurred part to be converted into black pixels. Japanese Patent Application Laid-Open No. 2016-224914 discusses a technique for evaluating a number of contents such as characters and a number of noises included in each of a plurality of binary images that have been binarized with a plurality of binarization thresholds, and selecting an appropriate binary image from the plurality of binary images.

However, the technique discussed in Japanese Patent Application Laid-Open No. 2016-224914 does not evaluate a group of black pixels included in one binary image, with use of the other binary image. Accordingly, a group of black pixels used in predetermined processing may not be appropriately specified from groups of black pixels included in a binary image.

SUMMARY OF THE INVENTION

The present invention is directed to a technique for specifying a group of black pixels to be used or not to be used for predetermined processing, among groups of black pixels included in a binary image, with use of the other binary image.

According to an aspect of the present invention, an image processing apparatus configured to separate at least one group of pixels during binarization processing for subsequent processing, includes a first binarization unit configured to perform first binarization processing on an input image to convert pixels darker than a first set of binarization thresholds into black pixels to generate a first binary image, a second binarization unit configured to perform second binarization processing on the input image to generate a second binary image, the second binarization processing using a second set of binarization thresholds which are respectively smaller than the first binarization thresholds used in the first binarization processing with respect to a same pixel of the input image, a separation unit configured to separate at least one group of black pixels out of the groups of black pixels included in the second binary image with use of at least the first binary image, and a processing unit configured to perform the subsequent processing, based on a result of the separation, using the groups of black pixels included in the second binary image.

Further features of the present invention will become apparent from the following description of exemplary embodiments with reference to the attached drawings.

BRIEF DESCRIPTION OF THE DRAWINGS

FIG. 9 is a diagram illustrating a flow of the noise region determination processing according to the first exemplary embodiment of the present invention.

DESCRIPTION OF THE EMBODIMENTS

Exemplary embodiments of the present invention will be described below with reference to drawings.

<Configuration of Mobile Terminal>

Figure 1A:
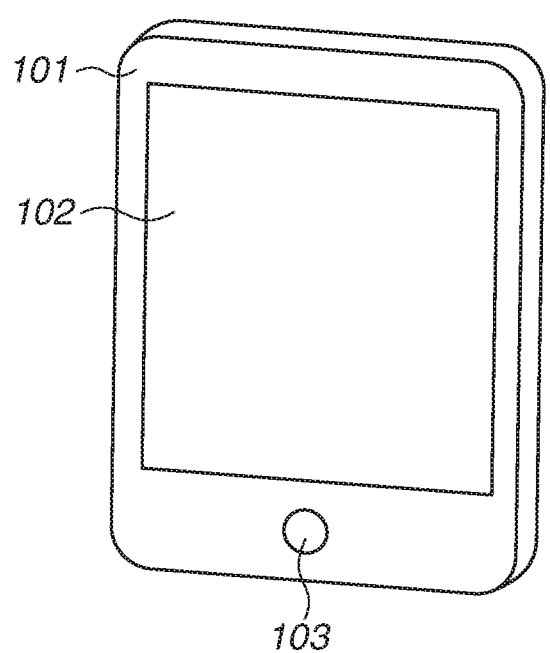
FIGS. 1A and 1B are schematic diagrams of a mobile terminal according to a first exemplary embodiment of the present invention.
Figure 1B:
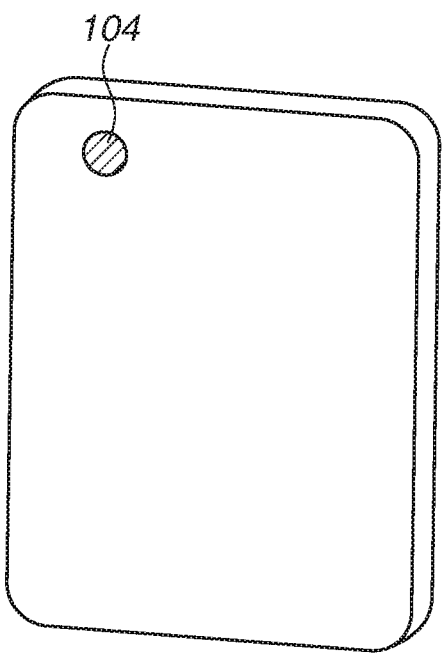

FIGS. 1A and 1B illustrate a mobile terminal (information processing apparatus, or image processing apparatus) 101 used in a first exemplary embodiment. FIG. 1A is an appearance diagram of front side of the mobile terminal 101, and the mobile terminal 101 includes a touch panel display 102 and an operation button 103 on the front side. FIG. 1B is an appearance diagram of rear side of the mobile terminal 101, and a camera 104 is provided on the rear side. The camera 104 is mounted with an unillustrated automatic focusing mechanism that enables measurement of a focus position and a subject distance.

The first exemplary embodiment is applicable to an apparatus including an imaging function. For example, the first exemplary embodiment is applicable not only to a smartphone (mobile phone), a tablet terminal, and a personal computer (PC) each including an imaging function but also to a digital camera including a touch panel display. In addition, the first exemplary embodiment is applicable to, for example, a PC that is connected to a camera wiredly or wirelessly. Moreover, a mobile terminal, a PC, or the like may read image data captured by a camera or the like, from a storage device (e.g., memory card) that holds the image data, and may perform the processing of the present exemplary embodiment.

Figure 2:
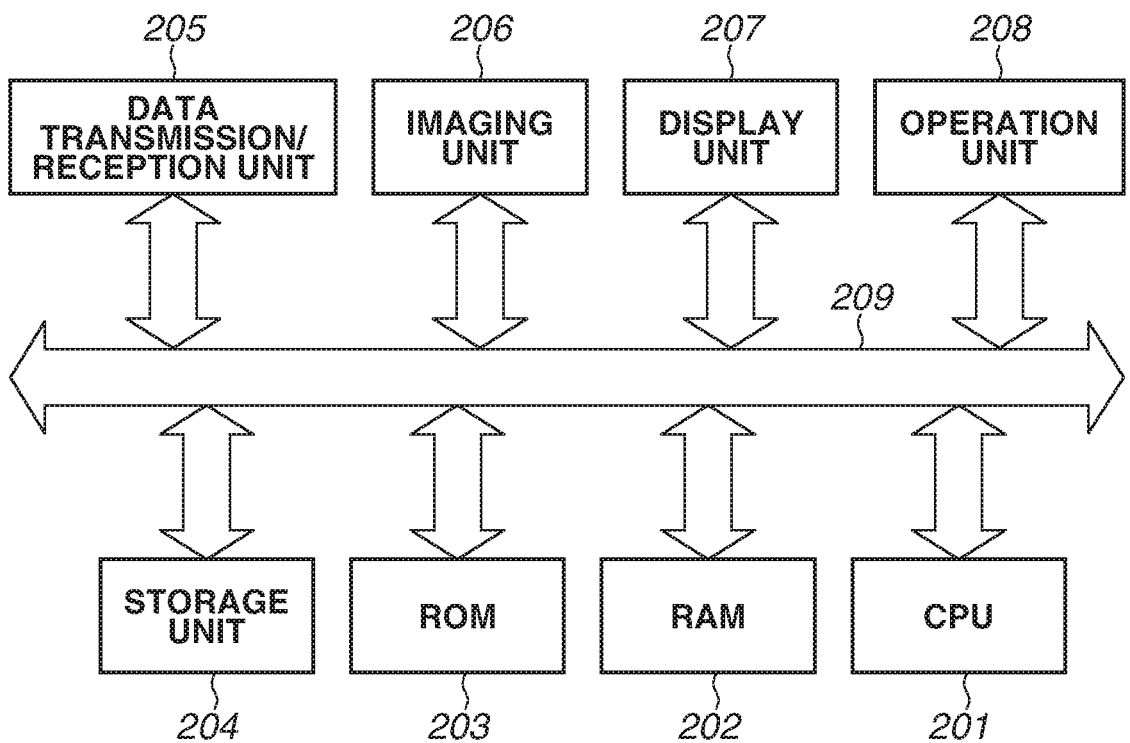
FIG. 2 is a block diagram illustrating a schematic configuration of the mobile terminal according to the first exemplary embodiment of the present invention.

FIG. 2 illustrates a hardware configuration inside the mobile terminal 101. The configuration diagram illustrates an example of the configuration for implementing the present exemplary embodiment, and does not intend to limit the configuration. In FIG. 2, a central processing unit (CPU) 201, a random access memory (RAM) 202, and a read-only memory (ROM) 203 transmit or receive programs and data through a data bus 209. A storage unit 204, a data transmission/reception unit 205, an imaging unit 206, a display unit 207, and an operation unit 208 are connected to the data bus 209. Further, these units transmit or receive programs and data together with the CPU 201, the RAM 202, and the ROM 203 from one another.

Figure 3:
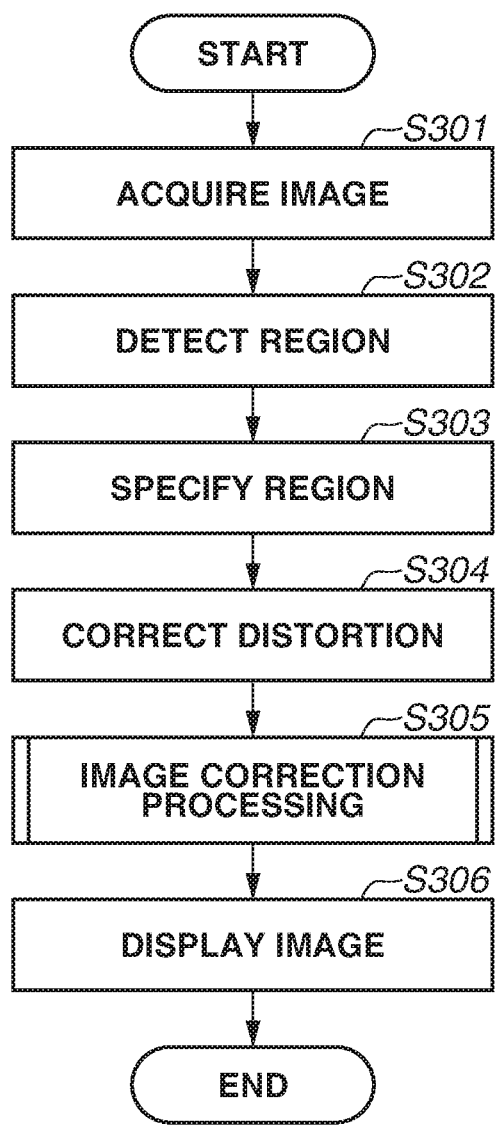
FIG. 3 is a flowchart of a processing procedure according to the first exemplary embodiment of the present invention.

The storage unit 204 is a flash memory that holds image data and various kinds of programs including a program to execute processing flow of FIG. 3.

The data transmission/reception unit 205 includes a wireless local area network (LAN) controller, and realizes transmission/reception of data with the outside.

The imaging unit 206 is a camera that performs imaging of a white board surface to acquire a captured image. The acquired captured image is imparted with header information that includes a manufacturer name and a model name of the mobile phone, image resolution, aperture (F value), a focal distance, etc., and the captured image imparted with the header information is transmitted to each of the units as described below.

The display unit 207 is a display configuring the touch panel display 102, and displays a live view of a video image of the subject when the white board surface is imaged with use of the imaging function.

The operation unit 208 includes a touch panel configuring the touch panel display 102 and the operation button 103, and receives an operation by a user to transmit information of the operation to each of the units.

The CPU 201 executes a computer program held by the ROM 203 or the storage unit 204, thereby controlling the components in the mobile terminal 101.

<Detailed Description of Present Exemplary Embodiment Referring to Flowchart>

Figure 4A:
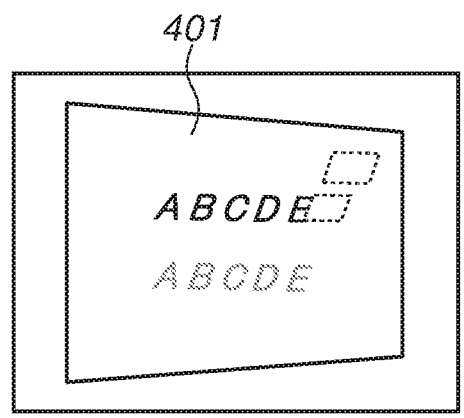
FIGS. 4A to 4C are diagrams respectively illustrating frame detection processing, frame specification, and distortion correction processing according to the first exemplary embodiment of the present invention.
Figure 4B:
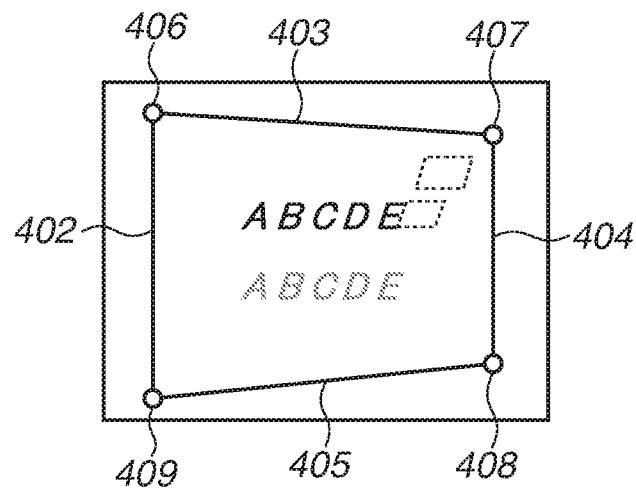
Figure 4C:
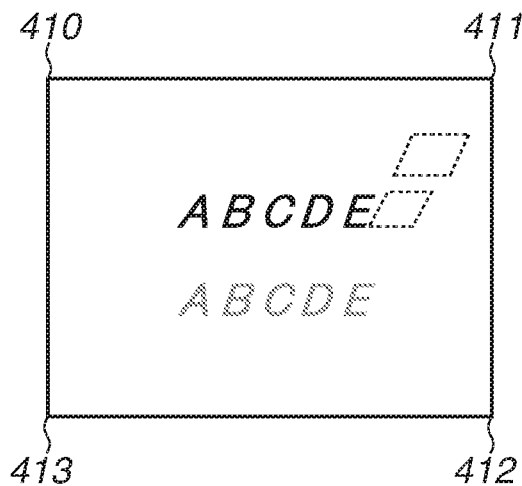

In the present exemplary embodiment, an application used by a user to capture an image of the white board surface with use of the mobile terminal 101, and to cut out a part of the white board surface from the captured image to correct the image is assumed. FIG. 3 is a flowchart illustrating a procedure of processing performed by the mobile terminal 101 in the present exemplary embodiment. In addition, FIGS. 4A to 4C are diagrams illustrating a flow of processing to cut out the part of the white board surface from the captured image.

The CPU 201 (computer) of the mobile terminal 101 functions as a processing unit for executing processes in respective steps in FIG. 3 by loading a processing program held by the ROM 203 to the RAM 202 and executing the processing program. The CPU 201 may function as the processing unit for executing processes in respective steps described below by storing, in the storage unit 204, the processing program that has been acquired from an external server through the data transmission/reception unit 205, loading the processing program to the RAM 202, and executing the processing program.

In step S301, the CPU 201 acquires input image data that has been selected or captured by the user. In a case where the input image data is selected, the CPU 201 selects the image data that has been instructed by the user through the operation unit 208 from image data held by the storage unit 204, a memory card, etc., and acquires the selected image data through the data bus 209. In a case where the input image data is captured, the CPU 201 receives an imaging instruction from the user through the operation unit 208, and acquires image data that has been acquired by the imaging unit 206, through the data bus 209. The input image data is a color image of three channels of red (R), green (G), and blue (B). FIG. 4A illustrates the input image data, and a region where a white board surface 401 is captured is included in the image.

In step S302, the CPU 201 executes region specification processing to specify a quadrilateral region that indicates a shape of the white board surface, from the input image data acquired in step S301. The region specification processing is realized when a group of candidate line segments (group of candidate edges) of respective edges of the white board surface are detected, and a quadrilateral including a combination of the candidate line segments in the group is evaluated. The detection of the group of candidate line segments and the evaluation of the quadrilateral are performed with use of well-known methods. For example, the group of candidate line segments is detected by Hough conversion algorism that votes edge information detected from the input image, on polar coordinates to detect straight lines. In addition, the quadrilateral may be evaluated based on geometric information such as a ratio of lengths of opposite sides, an internal angle, and an aspect ratio, or based on image information, for example, comparison of colors or dispersion between the inside and the outside of the line segments configuring the quadrilateral.

In step S303, the CPU 201 displays the quadrilateral region detected in step S302 on the input image data in a superimposing manner, and executes region specification processing of receiving shape change (correction) of the displayed quadrilateral region from the user. FIG. 4B is an image in which the specified quadrilateral region is displayed on the input image in a superimposing manner. Sides 402, 403, 404, and 405 of the specified region are each a side handler to receive an instruction of a position of the corresponding side from the user. In addition, apexes 406, 407, 408, and 409 of the specified region are each an apex handler to receive an instruction of a position of the corresponding apex from the user. The user selects and operates the side handlers and the apex handlers to change the shape of the quadrilateral region.

In step S304, the CPU 201 extracts an image of a part of the input image data included in the quadrilateral region specified in step S303, and executes distortion correction processing of correcting distortion to form a rectangular image. The distortion is corrected through projective transformation in consideration of a case where the quadrilateral region is distorted in a shape other than a trapezoid. A projective transformation matric can be calculated from apex information (apexes 406, 407, 408, and 409) of the quadrilateral region in the input image and coordinate information (corners 410, 411, 412, and 413) of four corners of an output image with use of a well-known method. In a case where priority is given to a processing speed, an affine transformation matrix or a simple variable magnification may be calculated as a variable magnification parameter. FIG. 4C illustrates a resultant image of the distortion correction.

In step S305, the CPU 201 executes image correction processing on the distortion-corrected image obtained in step S304. Details of the image correction processing will be described below with reference to FIG. 5 and FIG. 6.

In step S306, the CPU 201 displays, on the display unit 207, a resultant image of the image correction processing executed in step S305. The user can confirm the displayed image, and issue a save instruction of the resultant image of the image correction processing to the CPU 201 through the operation unit 208. Upon receiving the save instruction, the CPU 201 saves the resultant image of the image correction processing in the storage unit 204. A file format of the resultant image to be saved may be a joint photographic experts group (JPEG) format, a portable document format (PDF), or the like without limitation to a specific file format.

The processing flow described above is the processing flow executed by the CPU 201 according to the present exemplary embodiment.

<Detailed Description of Image Correction Processing (Step S305)>

Figure 5:
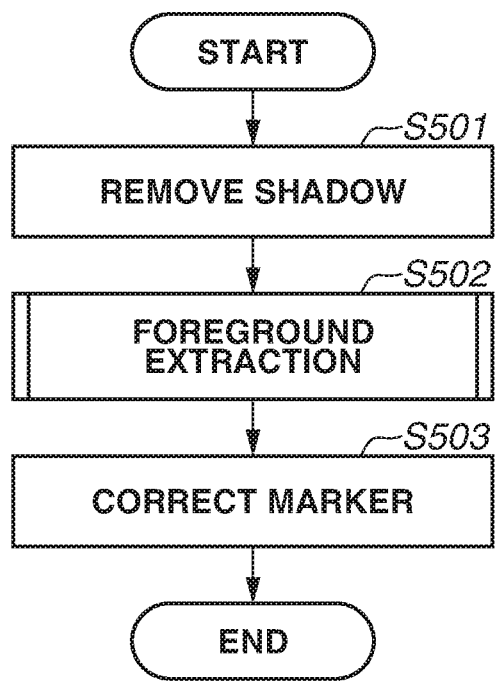
FIG. 5 is a flowchart of image correction processing according to the first exemplary embodiment of the present invention.

The details of the image correction processing will be described with reference to FIG. 5.

In step S501, the CPU 201 executes shadow removing processing (brightness unevenness removing processing) to remove brightness unevenness such as illumination unevenness and shadow from the image subjected to the distortion correction executed in step S304. In the shadow removing processing, brightness unevenness such as illumination unevenness and shadow is estimated from the distortion-corrected image to generate a shadow component image, and the input image is corrected according to a difference value between the distortion-corrected image and the shadow component image to generate a shadow-removed image. In other words, the shadow component image is a color image (image including RGB components) having the same size as the size of the distortion-corrected image, and values (RGB values) of pixels in the shadow component image are used to correct values of pixels at the corresponding coordinates in the distortion-corrected image. A shadow component is desirably acquired from a pixel value of a pixel included in a background region of the distortion-corrected image. A color of the background region of paper or a white board is normally white. Therefore, a pixel value of a pixel having a high luminance value (i.e., white) can be estimated as a shadow component value of the pixel. Accordingly, in the shadow removing processing, the following processing is performed.

The CPU 201 divides the distortion-corrected image into blocks each having a predetermined size (e.g., 8×8 pixels), and calculates the brightest pixel value in each block (RGB value of pixel having the maximum luminance value in each block), as a representative pixel value (shadow component value) of each block. The CPU 201 then acquires an image in which the representative pixel values of the respective blocks are arranged according to the arrangement of the blocks. At this time, in a case where the background region is included in the block, an appropriate shadow component value can be estimated. On the other hand, in a case where the background region is not included in the block due to a large object (content) such as a photograph and a diagram, it is difficult to estimate the appropriate shadow component value. Accordingly, a block that is extremely darker than neighboring blocks (e.g., block having the maximum luminance value lower than a value obtained by subtracting a predetermined value from the maximum luminance value of an adjacent block) is corrected with use of the representative pixel value of the adjacent block including the background region. In this way, the representative pixel values of the respective blocks are calculated in the above-described manner. The image of the representative values thus obtained has a size reduced from the size of the distortion-corrected image. Accordingly, the CPU 201 performs enlargement processing so that the number of pixels of the reduced image becomes equal to the number of pixels of the distortion-corrected image, thereby generating the shadow component image. The CPU 201 then uses the shadow component image to correct the RGB values of the respective pixels of the distortion-corrected image, thereby generating the shadow-removed image. For example, the RGB value of the pixel in the distortion-corrected image is corrected brighter as the luminance value of the corresponding pixel in the shadow component image is darker. The above-described contents are discussed in Japanese Patent Application Laid-Open No. 2017-22620.

Figure 6:
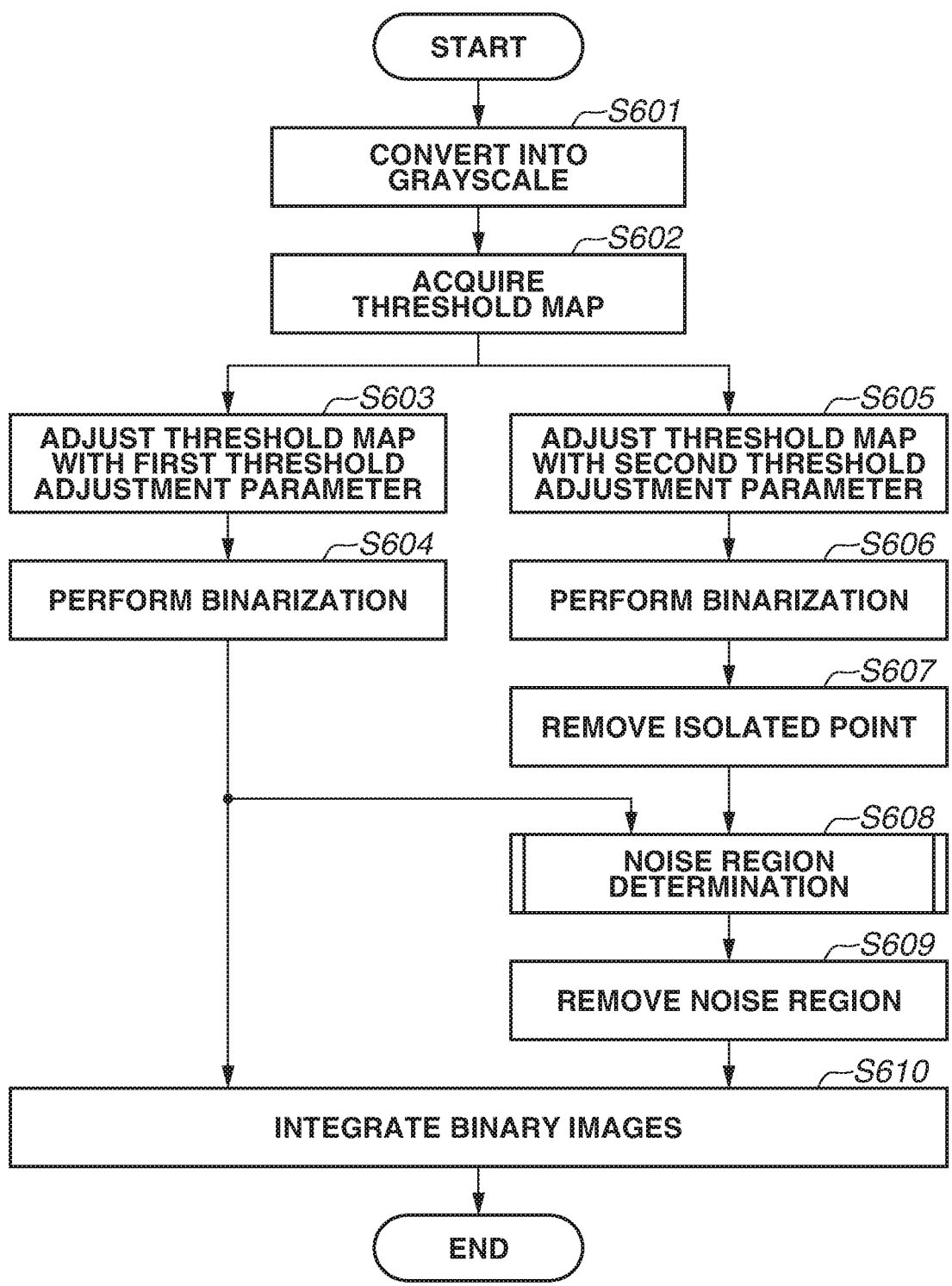
FIG. 6 is a flowchart of foreground extraction processing according to the first exemplary embodiment of the present invention.
Figure 7:
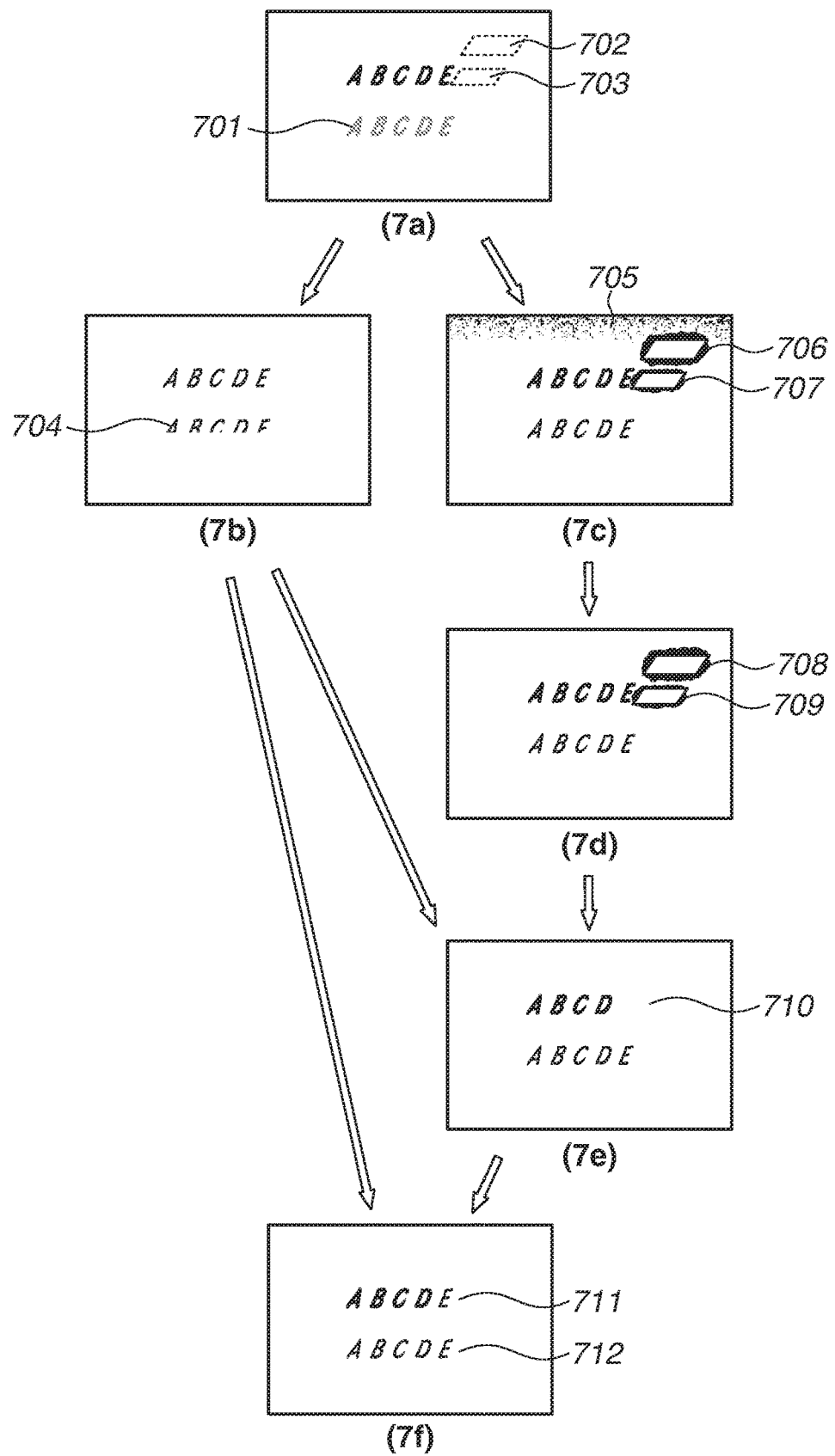
FIG. 7 is a diagram illustrating a flow of the foreground extraction processing according to the first exemplary embodiment of the present invention.

In step S502, the CPU 201 executes foreground extraction processing to extract (specify) coordinates of a pixel of foreground in the distortion-corrected image. In the foreground extraction processing, binarization processing described in detail with reference to FIG. 6 and FIG. 7 is performed on the distortion-corrected image. Coordinates of a black pixel in a binary image (corresponding to seventh binary image described below) obtained through the binarization processing indicate the coordinates of the foreground in the distortion-corrected image. A group of black pixels in the binary image is used for monochromatic processing in step S503. The monochromatization processing according to the present exemplary embodiment is an example of predetermined processing performed using the group of black pixels in the binary image. The details of the foreground extraction processing are described below with reference to FIG. 6 and FIG. 7.

In step S503, the CPU 201 uses the group of black pixels included in the binary image (seventh binary image described below) generated in step S502, to perform the monochromatization processing of a specified part (marker attribute part) of the shadow-removed image generated in step S501.

More specifically, the CPU 201 couples adjacent black pixels included in the binary image generated in step S502 to form one black pixel region (corresponding to a group of black pixels), and performs labeling processing to provide the same label to the pixels included in the black pixel region. The CPU 201 then refers to the pixel values of the pixels in the shadow-removed image corresponding to the coordinates of the black pixels provided with the same label, to determine whether the pixels have a marker attribute or a non-marker attribute. In the attribute determination, for example, YUV values of the pixels are obtained from the RGB values of the pixels in the shadow-removed image, and a variance value of each of U and V components (color difference components) is calculated. When both of the variance values are lower than thresholds, an attribute of the pixels is determined as the marker attribute.

Next, the CPU 201 determines a substitute color of the pixels determined as the marker attribute. In the present exemplary embodiment, four colors of black, red, blue, and green that are representative colors of white board markers are regarded as defined marker colors, and monochromatization is performed according to an average color of the pixels in a YUV color space. The range of each of black, red, blue, and green in the YUV color space is previously defined, and when the average color of each region corresponds to any of the ranges of the defined marker colors, the pixels are monochromatized to one corresponding color of the four colors. When the average color is within a range other than the four defined marker colors, the pixels are monochromatized to the average color of the region. The monochromatization is performed when the CPU 201 substitutes (overwrites) the RGB values of the pixels that have been determined as the marker attribute in the shadow-removed image, with the RGB value of the determined substitute color.

The shadow removing processing and the monochromatization processing are performed on the distortion-corrected image in the above-described manner.

<Detailed Description of Foreground Extraction Processing (Step S502)>

The details of the foreground extraction processing will be described with reference to FIG. 6 and FIG. 7. The distortion-corrected image is handled as the input image.

In step S601, the CPU 201 converts the input image into a grayscale image. The grayscale image is also referred to as a luminance image. In a case where the input image is a color image of three channels of red (R), green (G), and blue (B), the channels are mixed at a predetermined ratio to generate an image of one channel. The mixing ratio at this time is not particularly limited. For example, the grayscale image may be generated by National Television Standards Committee (NTSC) weighted average method. An image (a) of FIG. 7 illustrates the grayscale image that includes a blurred character 701 and illumination reflection regions 702 and 703.

In step S602, the CPU 201 generates a threshold map (threshold array) that corresponds to a two-dimensional array of binarization thresholds with respect to the pixels of the gray scale image. In the present exemplary embodiment, the threshold map is generated in a similar manner to the shadow component image that is generated through the shadow removing processing in step S501 of FIG. 5. However, the threshold map is an image including one component of the binarization threshold to binarize the grayscale image whereas the shadow component image generated in step S501 is the image including the color components (RGB components). In other words, the threshold map is represented by the image having the same size as the grayscale image, and the values of the pixels in the threshold map are the binarization thresholds of the pixels at the corresponding coordinates in the grayscale image. Accordingly, to create the threshold map, the CPU 201 sets not the RGB value of the pixel having the maximum luminance value but the maximum luminance value itself, as the representative pixel value of each of the blocks. The correction of the representative value of each of the blocks is performed with use of the luminance value of the adjacent block as with the generation of the shadow component image. The method of creating the threshold map is not limited to the above-described method and may be a well-known method. For example, a threshold uniform with respect to the entire image, obtained with use of Otsu's method may be used as the threshold map. In addition, for example, a local binarization threshold that is obtained by referring to the luminance values of neighboring pixels of a relevant pixel to determine the binarization threshold of the relevant pixel may be used as the threshold map.

In step S603, the CPU 201 performs adjustment to uniformly reduce the pixel values of the threshold map obtained in step S601, with a first threshold adjustment parameter value. In the present exemplary embodiment, adjustment is performed so as to uniformly reduce, by ten, the values of the pixels that are each represented by 8 bits (0 to 255) in the threshold map, which suppresses noise of the background region having a value close to the value of the pixel in the threshold map. The threshold is not necessarily reduced in this step, and it is sufficient to make the threshold relatively lower than a threshold adjustment result in step S605 described below.

In step S604, the CPU 201 uses the threshold map (first threshold array) adjusted in step S603 to perform the binarization processing (first binarization processing) on the grayscale image, thereby generating a first binary image. For description, it is assumed that the values of the pixels are each represented by 8 bits in both of the grayscale image and the threshold map, the pixel value 0 corresponds to black, and the pixel value 255 corresponds to white. In addition, it is assumed that, in the binary image to be output, the values of the pixels are each represented by 1 bit, the pixel value 0 corresponds to white, and the pixel value 1 corresponds to black. The pixel value of the grayscale image at the coordinates (x, y) is denoted by $g(x, y)$, the pixel value of the threshold map is denoted by $t(x, y)$, and the pixel value of the binary image to be output is denoted by $b(x, y)$. The pixel value $g(x, y)$ of the grayscale image and the pixel value $t(x, y)$ of the threshold map at the same coordinates are compared to determine whether the pixel value $b(x, y)$ of the binary image is 0 or 1 in the following manner, and the binary image is generated.

$b(x, y)=0$ (white pixel) when $g(x, y) \geq t(x, y)$
$b(x, y)=1$ (black pixel) when $g(x, y) < t(x, y)$ In other words, the pixel with density higher (darker) than the binarization threshold among the pixels of the input image (or grayscale image) is converted into a black pixel, and the pixel with density lower (brighter) than the binarization threshold is converted into a white pixel. As a result, the binary image is generated.

An image (b) of FIG. 7 illustrates the binary image generated (output) in step S604. The threshold is adjusted to be smaller than the threshold map in step S602 to suppress the noise region in step S603. Therefore, the noise amount is small but the foreground of the blurred character 704 is not extracted.

In step S605, the CPU 201 adjusts the threshold map obtained in step S601 with a second threshold adjustment parameter value so as to reproduce, as a character, the part where the character is blurred, through the binarization processing in step S606 described below. In the present exemplary embodiment, in order to extract, as a part (foreground) of the character, the blurred part having a value close to the value of the pixel in the threshold map, adjustment is performed to uniformly increase the pixel values of the threshold map by five. The method of adjusting the threshold is not limited to the above-described method. In this step, the threshold is not necessarily increased, and it is sufficient to make the threshold relatively higher than the threshold adjustment result in step S603. In other words, the threshold map (first threshold array) adjusted and created in step S603 described above and the threshold map (second threshold array) adjusted and created in step S605 have the following relationship, i.e., the binarization threshold in the second threshold array is larger than the binarization threshold in the first threshold array for the same pixel of the grayscale image.

In step S606, the CPU 201 uses the grayscale image and the threshold map (second threshold array) adjusted in step S605 to perform the binarization processing, thereby generating the second binary image. An image (c) of FIG. 7 illustrates the binary image generated (output) in step S606. Since the threshold map is adjusted so as to reproduce the blurred character in step S605, the entire marker region is extracted. However, noise of an isolated point is extracted as foreground in a region 705 close to the pixel of the threshold map. In addition, noise regions 706 and 707 are extracted near the illumination reflection region having relatively sharp luminance change, though not to the extent of the boundary between the character and the background (background region). This is because the luminance change between adjacent pixels is large near the reflection region, and it is difficult to estimate the threshold map (i.e., shadow). In addition, the marker part is extracted thick as compared with the binary image in step S604 illustrated in the image (b) of FIG. 7.

In step S607, the CPU 201 performs processing (first black pixel removing processing) to remove the black pixel of the isolated point, on the binary image (second binary image) generated in step S606. Removal of the black pixel indicates conversion of the black pixel into a white pixel. The first black pixel removing processing is processing to convert the black pixel adjacent to a plurality of white pixels into a white pixel in the second binary image. At this time, the CPU 201 performs the first black pixel removing processing on the second binary image to generate a third binary image. The size of the black pixel to be removed that is referred to as the isolate point is not limited to one pixel×one pixel, and may be two pixels×one pixel, two pixels×two pixels, or the like. In the present exemplary embodiment, in order not to remove a thin character part and a small character part, a method of replacing the black pixel with a white pixel is used in a case where three or more pixels out of four pixels adjacent to the black pixel are white pixels. As another method of removing the isolated point, a black pixel block having a corresponding shape by pattern matching may be removed (converted into white pixels). An image (d) of FIG. 7 illustrates a resultant image of the isolated point removal.

In step S608, the CPU 201 performs noise region determination to determine whether the black pixel and the group of black pixels included in the binary image (second binary image having subjected to first black pixel removing processing, i.e., third binary image) generated in step S607 are noise regions. The noise region determination is processing to specify (detect) a group of black pixels that is significantly larger than the contents of the image of the corresponding region in the first binary image, out of the groups of black pixels included in the third binary image. For example, in a case where the relatively large group of black pixels (group of black pixels having specific size) is included in the third binary image even though the corresponding region of the first binary image includes a small number of black pixels or no black pixel, such a group of black pixels is specified as a noise region. As described above, whether the group of black pixels in the third binary image has the specific size depends on the image contents of the corresponding region in the first binary image. In other words, the processing in step S608 is processing to specify, from the groups of black pixels included in the second binary image, the group of black pixels having the specific size, based on the first binary image, and to determine the specified group of black pixels as the noise region. Details of the noise region determination will be described below with reference to FIG. 8 and FIG. 9.

In step S609, the CPU 201 removes (deletes) the group of black pixels determined as the noise region in step S608, from the third binary image. The processing corresponds to processing to convert the group of black pixels determined as the noise region in the third binary image into white pixels, to generate a sixth binary image (subsequent to fourth and fifth binary images described below). An image (e) of FIG. 7 illustrates a resultant image with the noise region removed. The regions 708 and 709 determined as the noise regions in step S608 are removed as illustrated in a region 710.

In step S610, the CPU 201 integrates the binary image (first binary image) in step S604 and the binary image (third binary image having subjected to noise region removal, i.e., sixth binary image) in step S609. A sum set (OR) of the two binary images are used for the integration. The pixel value of the binary image output in step S604 at the coordinates (x, y) is denoted by p(x, y), the pixel value of the binary image output in step S609 is denoted by q(x, y), and the pixel value of the binary image to be output is denoted by b(x, y). Whether the pixel value b(x, y) of the output image is 0 or 1 is determined in the following manner to generate a binary image (seventh binary image).

b(x, y)=0 (white pixel) when p(x, y)=0 and q(x, y)=0
b(x, y)=1 (black pixel) when p(x, y)=1 or q(x, y)=1

In other words, the processing is to generate a logical sum image of the two binary images based on the two binary images. The logical sum image is an object of the image processing in step S503. An image (f) of FIG. 7 illustrates the binary image output in step S610. Integrating two kinds of binarization results makes it possible to reproduce the blurred character as illustrated in a part 712 while suppressing a noise region as illustrated in a part 711.

<Detailed Description of Noise Region Determination Processing (Step S608)>

Figure 8:
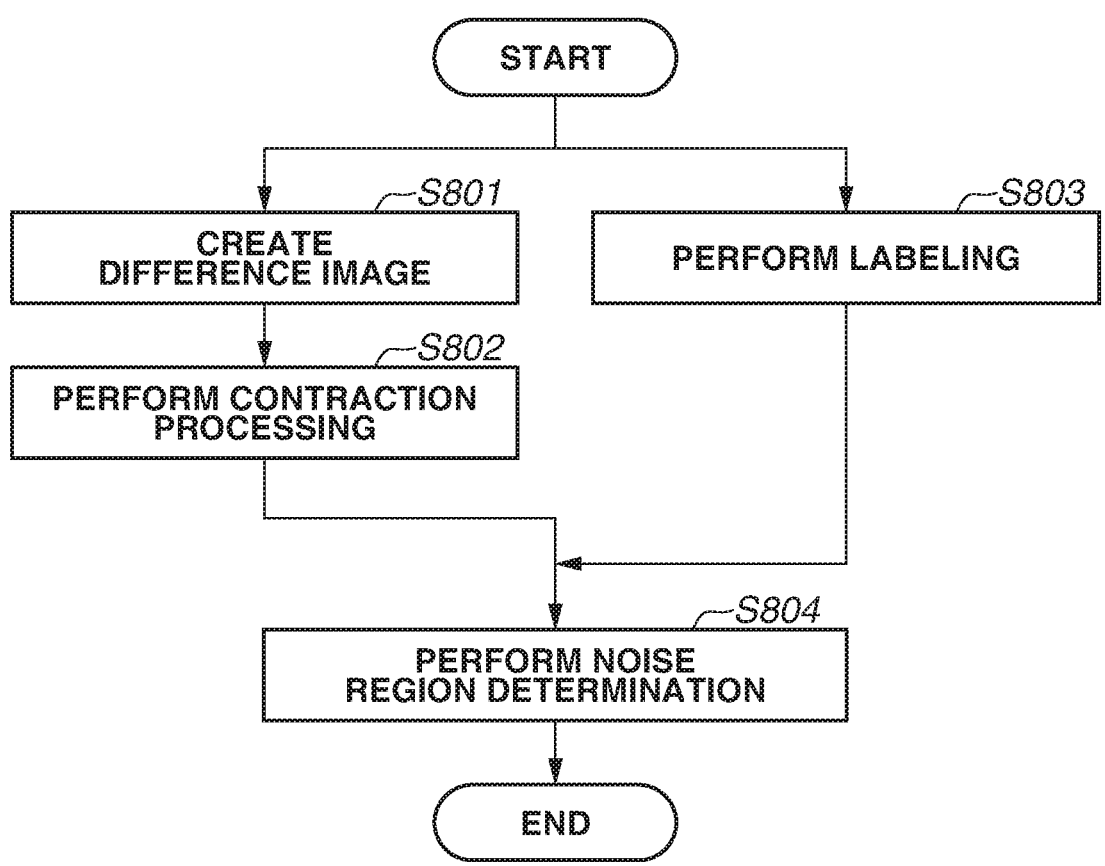
FIG. 8 is a flowchart of noise region determination processing according to the first exemplary embodiment of the present invention.

The details of the noise region determination processing will be described with reference to FIG. 8 and FIG. 9. Images (a) and (b) of FIG. 9 illustrate the input images in the noise region determination processing. The image (a) of FIG. 9 is the same as the binary image illustrated in the image (b) of FIG. 7 output in step S604, and the image (b) of FIG. 9 is the same as the binary image illustrated in the image (d) of FIG. 7 output in step S607. The noise region determination processing is processing to individually evaluate regions (groups of black pixels) of the binary image in the image (b) of FIG. 9 to determine whether each of the regions is a noise region including reflection, with use of another binary image. In other words, the group of black pixels as the noise region is specified at this time, and the specification result is used in processing in step S609 and subsequent steps thereto.

In step S801, the CPU 201 acquires a difference between the binary image (first binary image) generated in step S604 and the binary image (third binary image) generated in step S607, to generate a difference image (fourth binary image). The pixel value of the binary image in step S604 at the coordinates (x, y) is denoted by p(x, y), the pixel value of the binary image in step S607 is denoted by q(x, y), and the pixel value of the binary image to be output is denoted by b(x, y). Whether the pixel value b(x, y) of the output image is 0 or 1 is determined in the following manner to generate a binary image.

b(x, y)=0 (white pixel) when p(x, y)=q(x, y)
b(x, y)=1 (black pixel) when p(x, y)!=q(x, y)

In other words, the processing is to generate, as the fourth binary image, an exclusive logical sum image of the two binary images based on the two binary images. An image (c) of FIG. 9 illustrates the difference image. Regions not included in the image (a) of FIG. 9, like noise regions 901 and 902 and a blurred marker region 903 are extracted as difference. Further, in the binary image illustrated in the image (b) of FIG. 9 output in step S607, a marker part is extracted thick as compared with the binary image illustrated in the image (a) of FIG. 9 output in step S604. Therefore, a region 903 bordering the marker part is extracted as the difference.

In step S802, the CPU 201 performs contraction processing (also referred to as second black pixel removing processing) on the binary image (fourth binary image) generated in step S801 a plurality of times, to generate the fifth binary image. The contraction processing is performed in order to facilitate specification of the group of black pixels significantly larger than the contents of the first binary image, out of the groups of black pixels in the third binary image.

In the present exemplary embodiment, the contraction processing is a method of replacing the black pixel with a white pixel in a case where at least one pixel out of eight pixels adjacent to the black pixel is white pixel in the binary image. In other words, the contraction processing corresponds to processing to convert the black pixel adjacent to at least one white pixel, into a white pixel in order to convert contour black pixels of the group of black pixels into white pixels. Therefore, when the contraction processing is repeated a predetermined number of times, the group of black pixels in the difference image is reduced in width by a predetermined pixel width corresponding to the predetermined number of times. As a result of the contraction processing, the black pixel remains because the group of black pixels that is a noise region including illumination reflection is relatively large, and black pixels of thin regions (relatively small group of black pixels) are completely removed. An example of such a thin region is a marker bordering region 903 and a blurred marker region 904. In other words, as described below, the group of black pixels in the third binary image that has a width exceeding the predetermined pixel width and corresponds to the group of black pixels in the difference image is specified as the noise region following contraction processing in S802.

The number of repetition times of the contraction processing may be previously determined (e.g., three times). Alternatively, the number of repetition times of the contraction processing may be determined according to the image size. For example, the number of repetition times may be increased when the image size is larger.

In step S803, the CPU 201 performs labeling on the groups of black pixels of the binary image (third binary image) illustrated in the image (9*b*) of FIG. 9 generated in step S607, to extract each group of adjacent black pixels as an isolated region. At this time, one black pixel not adjacent to a black pixel is also extracted as a separate isolated group of black pixels.

In step S804, the CPU 201 determines whether each of the isolated regions obtained in step S803 is a noise region. The determination is performed based on whether each of the isolated regions obtained in step S803 includes coordinates of a black pixel of the binary image (fifth binary image, (d) in FIG. 9) generated in step S802. In a case where at least one pixel at the coordinates within an isolated group of pixels in the third binary image corresponds to the coordinates of the black pixel included in the fifth binary image, it is determined that the isolated region is a noise region. An image (9*e*) of FIG. 9 illustrates a determination result from S803. Isolated regions 905 and 906 each include a black pixel of the image illustrated in the image (9*d*) of FIG. 9. Therefore, the isolated regions 905 and 906 are determined as the noise regions. On the other hand, each of isolated regions 907 to 916 does not include the black pixel of the image illustrated in the image (9*d*) of FIG. 9 in the corresponding region. Therefore, the isolated regions 907 to 916 are not determined as the noise regions.

Steps S803 and 804 described above are based on the following concept. The group of black pixels included in the third binary image is larger than the group of black pixels included in the first binary image because the binarization threshold is relatively large. In addition, if the black pixels remain even after the contraction processing is repeatedly performed on the difference image between the first binary image and the third binary image, the group of black pixels included in the third binary image corresponding to the remaining black pixels correspond to a binarized noise region including illumination reflection, etc. It is sufficient to perform the noise region determination according to such a concept, and the determination method is not limited to the above-described determination method. Another method is described in the following modification of the embodiment.

As described above, according to the present exemplary embodiment, it is possible to appropriately specify the group of black pixels to be used in subsequent processing.

As described above, according to the present exemplary embodiment, it is possible to appropriately specify the group of black pixels to be used in the predetermined processing.

The binarization result with the threshold for noise suppression and the binarization result with the threshold for reproduction of the blurred character with the noise region removed are integrated, and thus it becomes possible to realize reproduction of the blurred character and suppression of the noise region in the foreground extraction from the captured image. In addition, even in a case where the illumination reflection region and the marker region are located close to each other, it is possible to extract only the marker part as the foreground.

<Modification>

In the first exemplary embodiment, the processing in step S608 has been performed in order to distinguish and specify (separate) the noise region such as the illumination reflection region from the foreground region such as the marker part. In a modification example, the following processing is performed instead of the processing.

The CPU 201 performs labeling processing on the groups of black pixels included in the third binary image. Next, the CPU 201 performs the following processing (1) to (3) on each label. (1) The CPU 201 counts the number of black pixels with the same label. (2) The CPU 201 counts the number of black pixels included in the pixel group at the coordinates in the first binary image corresponding to the coordinates of each of the black pixels with the same label. (3) The CPU 201 compares the two counted numbers. When a difference therebetween is equal to or larger than a threshold, the CPU 201 determines that the group of black pixels with the same label is significantly larger than the contents of the first binary image, and specifies the group of black pixels as the illumination reflection region (noise region). This allows the CPU 201 to specify the group of black pixels having the specific size based on the first binary image, out of the groups of black pixels included in the third binary image, and to determine the specified group of black pixels as the noise region.

<Other Exemplary Embodiments>

In the above-described exemplary embodiments, processing in steps S608 and S609 has been performed after the processing in step S607. Alternatively, the processing in step S607 may be performed after the processing in steps S608 and S609.

In the above-described exemplary embodiments, all of the image processing is performed by the mobile terminal 101. However, a part of the processing in FIG. 3 may be performed by an external server outside the mobile terminal 101. For example, when processing in steps S304 and S305 is performed by the external server, the above-described image correction processing can be used even in a case where a mobile terminal includes small memory resources and small calculation resources. Since the processing in steps S301 to S303 receives the operation by the user (e.g., changing operation of quadrilateral region), the processing in steps S301 to S303 is performed not by the server but by the mobile terminal 101. In the case where the processing in steps S304 and S305 is performed by the server, the mobile terminal 101 transmits the image acquired in step S301 and the apex information of the quadrilateral region to the server through the data transmission/reception unit 205 after the processing in step S303. The server performs the processing in step S304 based on the image and the apex information of the quadrilateral region. After the processing in step S305, the server transmits the resultant image of the image correction processing to the mobile terminal 101 through a data transmission/reception unit. The mobile terminal 101 displays the received image in step S306.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-101042, filed May 22, 2017, which is hereby incorporated by reference herein in its entirety.

What is claimed is:

1. An image processing apparatus configured to separate at least one group of pixels during binarization processing for subsequent processing, comprising:
a memory; and
a processor that causes the image processing apparatus to execute:
performing first binarization processing on an input image to convert pixels darker than a first set of binarization thresholds into black pixels and convert pixels lighter than or equal to the first set of binarization thresholds to white pixels to generate a first binary image,
performing second binarization processing on the input image to generate a second binary image, the second binarization processing using a second set of binarization thresholds which are respectively smaller than the first binarization thresholds used in the first binarization processing with respect to a same pixel of the input image,
separating at least one group of black pixels out of the groups of black pixels included in the second binary image by generating a difference image obtained by calculating a difference between the first binary image and the second binary image, and separating, in a case where a black pixel exists in a contracted binary image as a result of contraction processing that is performed on the difference image to convert a black pixel adjacent to a white pixel into a white pixel, a group of black pixels included in the second binary image corresponding to the remaining black pixel in the contracted binary image as a group of black pixels not to be used in the subsequent processing, and
deleting, from the second binary image, the group of black pixels separated as the group of black pixels not to be used in the subsequent processing.

2. The image processing apparatus according to claim 1, wherein, in the separating, in a case where a width of the group of black pixels included in the difference image exceeds a predetermined pixel width, the group of black pixels is separated as a group of black pixels not to be used in the subsequent processing.

3. The image processing apparatus according to claim 1, wherein the processor causes the image processing apparatus to further execute performing the subsequent processing using the group of black pixels included the first primary image and the group of pixels in the second binary image after the deletion of the group not to be used in subsequent processing.

4. The image processing apparatus according to claim 1, wherein the input image is a grayscale image acquired from a color image, and
wherein the processor causes the image processing apparatus to further perform, as the subsequent processing, determining whether to monochromatize a part of the color image corresponding to the group of black pixels included in the binary image, and monochromatizing the part of the color image with a predetermined color corresponding to a marker color of the part of the color image corresponding to the group of black pixels in a case that an average color in the color image corresponding to the group of black pixels corresponds to the marker color.

5. An image processing method of separating at least one group of pixels during binarization processing for subsequent processing, the image processing method comprising:
performing a first binarization processing on an input image to convert pixels darker than a first set of binarization thresholds into black pixels and convert pixels lighter than or equal to the first set of binarization thresholds to white pixels to generate a first binary image;
performing a second binarization processing on the input image to generate a second binary image, the second binarization processing using a second set of binarization thresholds which are respectively smaller than the first binarization thresholds used in the first binarization processing with respect to a same pixel of the input image;
separating at least one group of black pixels out of the groups of black pixels included in the second binary image by generating a difference image obtained by calculating a difference between the first binary image and the second binary image, and separating, in a case where a black pixel exists in a contracted binary image as a result of contraction processing that is performed on the difference image to convert a black pixel adjacent to a white pixel into a white pixel, a group of black pixels included in the second binary image corresponding to the remaining black pixel in the contracted binary image as a group of black pixels not to be used in the subsequent processing; and deleting, from the second binary image, the group of black pixels separated as the group of black pixels not to be used in the subsequent processing.

6. A non-transitory storage medium storing a program for causing a computer to execute:

performing first binarization processing on an input image to convert pixels darker than a first set of binarization thresholds into black pixels and convert pixels lighter than or equal to the first set of binarization thresholds to white pixels to generate a first binary image;

performing second binarization processing on the input image to generate a second binary image, the second binarization processing using a second set of binarization thresholds which are respectively smaller than the first binarization thresholds used in the first binarization processing with respect to a same pixel of the input image;

separating at least one group of black pixels out of the groups of black pixels included in the second binary image by generating a difference image obtained by calculating a difference between the first binary image and the second binary image, and separating, in a case where a black pixel exists in a contracted binary image as a result of contraction processing that is performed on the difference image to convert a black pixel adjacent to a white pixel into a white pixel, a group of black pixels included in the second binary image corresponding to the remaining black pixel in the contracted binary image as a group of black pixels not to be used in the subsequent processing; and deleting, from the second binary image, the group of black pixels separated as the group of black pixels not to be used in the subsequent processing.

\* \* \* \* \*